United States Patent
Grosseau

[15] 3,701,542
[45] Oct. 31, 1972

[54] VEHICLE SUSPENSION SYSTEM

[72] Inventor: Albert A. G. Grosseau, Chaville (Hauts-de-Seine), France

[73] Assignee: Societe Anonyme Automobiles Citroen, Paris, France

[22] Filed: July 15, 1970

[21] Appl. No.: 55,055

[30] Foreign Application Priority Data

July 16, 1969 France.....................6924221
May 14, 1970 France.....................7017675

[52] U.S. Cl...............................280/124 B, 267/57
[51] Int. Cl................................B60g 11/24
[58] Field of Search............280/124 B; 267/57, 57 A

[56] References Cited

UNITED STATES PATENTS 3,181,885  5/1965  Barcos......................267/57 X
2,165,033  7/1939  Dauben...............280/124 B X
2,786,670  3/1957  Hammond..............280/124 B
3,104,095  9/1963  Eirhart....................280/124 B

*Primary Examiner*—Philip Goodman
*Attorney*—Fitzpatrick, Cella, Cannon, Scinto, Harper, Bradley, Grimes, Brunet and Baechtold

[57] ABSTRACT

A vehicle suspension system for a transverse pair of vehicle wheels comprising a pivotal linkage connected to each wheel and torsion bars connected to each pivotal linkage and each bar being mounted on the vehicle chassis. The torsion bars are interconnected at their ends remote from the respective connections to the pivotal linkages by an elongate lamina member or members, the member or members lying in the plane of the torsion bars or in a plane parallel to the plane of the torsion bars.

4 Claims, 7 Drawing Figures

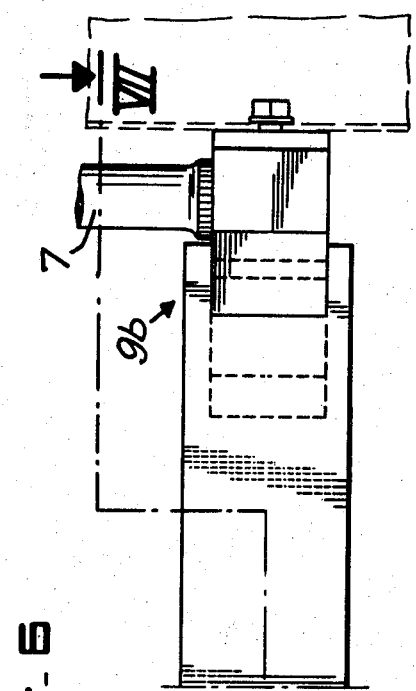
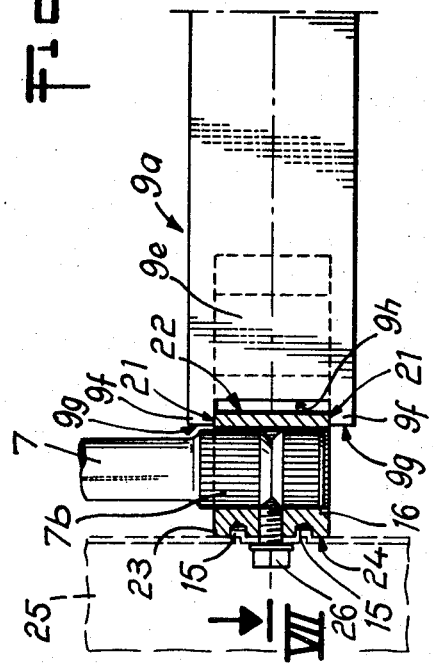
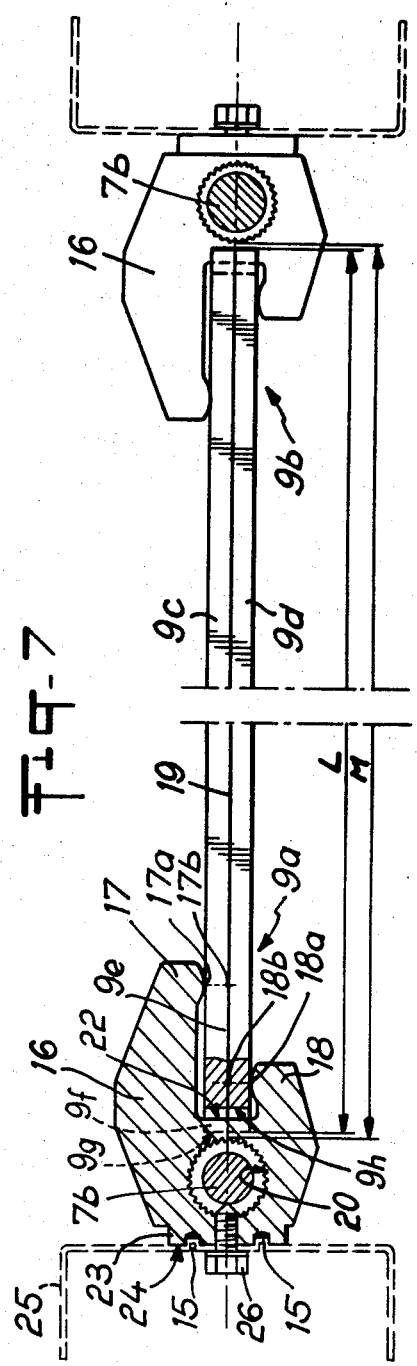
Fig-6
Fig-7

VEHICLE SUSPENSION SYSTEM

BACKGROUND OF THE INVENTION

1. Field of the Invention.

The invention relates to a vehicle suspension system.

2. Description of the Prior Art.

Suspension arrangements complementary to main suspensions of vehicles have been proposed which have the purpose of reducing variations in position of the bodywork relatively to the ground.

Although the majority of these arrangements are supplementary to the main suspension already installed in the vehicle and have for this reason an effect parallel to that of the main suspension, others are incorporated in suspensions of which they form an integral part.

SUMMARY OF THE INVENTION

According to the present invention there is provided a suspension system for a transverse pair of vehicle wheels comprising two torsion bars, one said torsion bar being connected to one wheel of the pair through a pivotal linkage and the other torsion bar being connected to the other wheel through another pivotal linkage, said torsion bars being interconnected by resilient laminar means fast at its ends for rotational movement with a corresponding said torsion bar, said resilient laminar means lying in a plane parallel to the common plane of said torsion bars or lying in said plane.

BRIEF DESCRIPTION OF THE DRAWINGS

The invention will now be described, by way of example, with reference to the accompanying diagrammatic drawings, in which:

FIG. 6 is a fragmentary view plan of a modified embodiment; and

FIG. 7 is a fragmentary section on the line VII—VII of FIG. 5.

DESCRIPTION OF THE PREFERRED EMBODIMENT

Figure 1:
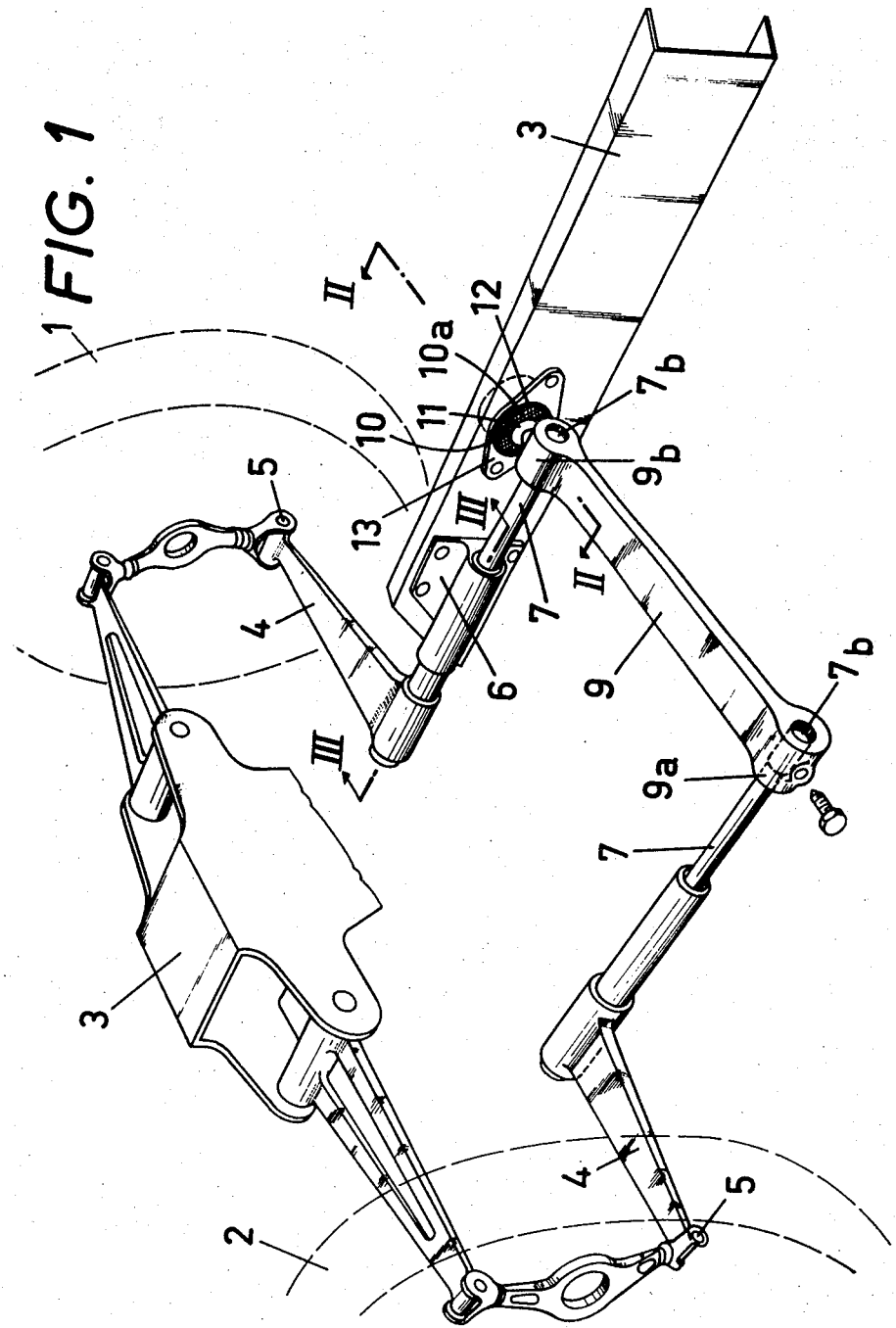
FIG. 1 is a fragmentary perspective view of a suspension system in accordance with the invention.
Figure 2:
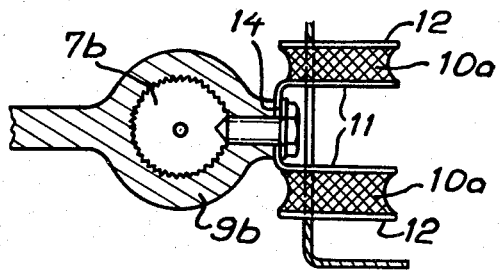
FIG. 2 is a section on the line II—II of FIG. 1.

Referring now to FIGS. 1 to 5, the front wheels 1, 2 of a vehicle are mounted by the suspension system on the structure 3 of a vehicle. Suspension arms 4 are connected to the wheels through pivot pins 5 and are mounted pivotally on the structure 3 by means of bearings 6. (see FIG. 3).

Figure 3:
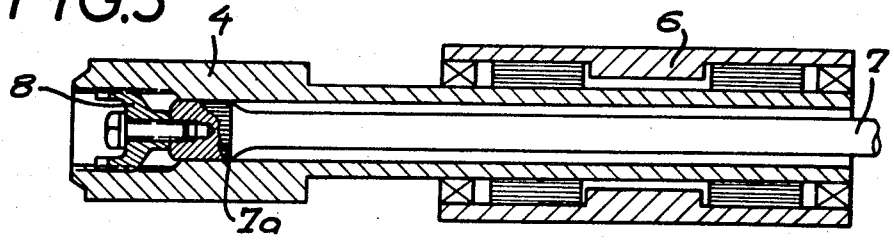
FIG. 3 is a section of the line III—III of FIG. 1.

Each torsion bar 7 is secured by its one end 7a to one of the two arms 4 and is locked place in the mounting by a locking member 8 (FIG. 3).

Customarily, the other end of each torsion bar 7 is secured in the structure 3 at the longitudinally extending members or at the transverse members. But this arrangement gives rise to difficulties, particularly where an anti-roll bar is associated with the torsion bars. Amongst these difficulties, is the large number of members, as well as the substantial increase in weight of the assembly.

The ends 7b of the bars 7 opposite to the ends 7a, are secured to the ends 9a and 9b of a resilient anti-roll member in the form of a lamina 9, which is itself connected to the structure 3 by resilient means 10.

The means 10 is constituted in the embodiment shown, by a ring 10a of an elastomer interposed between two metal annular members 11 and 12. One of the annular members, the external member 12, is mounted on the structure 3 by two flanges 13 which are rigid with that member 12 and are bolted to the structure 3. The other annular member 11 comprises a hollow cylinder having a base 14, secured for example, by a screw, on to one of the ends 9a or 9b of the laminar member 9.

It will also be noted that the laminar member 9 is resilient and can comprise for example a form of leaf spring. It is however, important that the plane of the lamina 9, which is intended to flex in operation should be at least parallel to the plane defined by the two torsion bars 7. Preferably, and as shown in the drawings, the plane of the lamina 9 will lie in the plane of the torsion bars.

Figure 5:
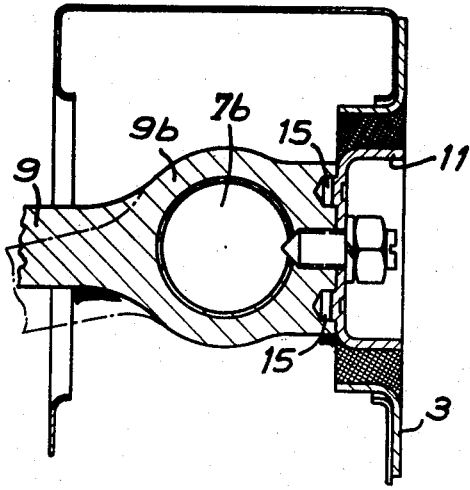
FIGS. 4 and 5 shown certain details of the embodiment.
Figure 4:
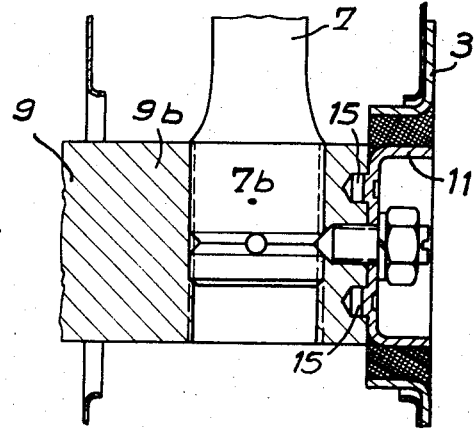

It is often desirable to provide a device preventing any pivoting of the ends 9a and 9b of the lamina 9 with respect to its fixed points on the resilient means 10. To this end lugs 15 are secured to one of the members, for example the base 14 of the annular member 11 and these lugs engage in complementary recesses in the other member, i.e. in the laminar member 9 as shown in FIGS. 4 and 5.

The advantages which are derived by the adoption of the suspension hereinbefore described are numerous as will be apparent hereinafter.

Firstly, the characteristics of the operation of such a suspension will be examined.

The suspension forces due to the weight of the vehicle are accommodated by the bearings 6. As regards the axial forces, acting substantially parallel to the axes of the torsion bars 7, they are accommodated by the torsion bars 7 and by the resilient means 10. It is also possible however that the axial forces should be resisted, in a modification of the embodiment, at the level of the suspension arms 4, provided for this purpose with conventional abutments particularly in a construction where the laminar member 9 is connected to the structure 3.

During operation, two uses which are quite different may arise, which correspond, one to symmetrical wheel clearances of the two wheels 1 and 2 with respect to the longitudinal plane of the vehicle, the other to asymmetrical clearances of the wheels 1 and 2 with respect to the same plane.

When the wheels have symmetrical clearances, torsion moments of opposite sign, but the same numerical value, act at each of the ends 9a and 9b of the lamina 9 which deflect.

The overall flexibility of the suspension is then equal to the sum of that of the bars 7 and the flexibility of the lamina 9 itself. The latter then has no anti-roll action, since, in fact there is no roll.

But it may happen that the wheel 1 has momentarily a different clearance from that of the wheel 2. An asymmetrical action on the lamina 9 follows, which, by its own resilience, tends to return to its initial, generally symmetrical, shape. The laminar member 9 thus tends to equalize the clearances of the two wheels and to act, for this reason, in an anti-roll function. The two wheels being supported by the ground, the laminar member 9 cooperates in reestablishing equal clearances of the wheels 1 and 2 with respect to the structure 3, consequently to reestablish equal distances from each of the sides of the structure 3 with respect to the ground, and thus to limit the roll of the structure itself.

It should be understood that in known manner the clearances of the wheels would be limited by suitably disposed abutments. Moreover, the securing of the torsion bars to the laminar member 9, would be so effected that the laminar member 9 would bend slightly when the bodywork is at its greatest distance with respect to laminas ground, the arms 4 of the wheels 1 and 2 being then in abutment with the stops.

The anti-roll laminar member 9 should be resiliently mounted on the structure in order to function as desired and be deformed as appropriate.

The suspension hereinbefore particularly described comprises only very few parts, the rods and conventional shafts which bring conventional anti-roll bars into operation having been omitted. The rods and shafts pivoted about axes or swivel joints having been omitted, the strength of the assembly has been increased by the omission of these parts which are sensitive to bad weather and old age.

It will be noted that it is sufficient to connect one member only, the anti-roll laminar member 9, to the torsion bar 7, in order to assemble the suspension in position. A rapid and easy assembly is thus achieved.

If reference is now made to FIGS. 6 and 7 it will be apparent in the modification of the embodiment which is just about to be described, that the essential members are the same as in the embodiment hereinbefore described.

The torsion bars 7 have their ends 7b secured in the ends 9a and 9b of a resilient anti-roll means forming the flexible lamina. In fact, this flexible lamina may be constituted by a plurality of elementary laminae and, as indicated in the embodiment shown, by two resilient flat laminae 9c and 9d.

The coupling securing the torsion bars 7 to the laminae 9c and 9d is constituted by a member 17 separate from the bars 9c and 9d connected to the two ends 9a and 9b. Each member 16 takes the form of a rigid jaw assembly with two jaws 17 and 18. The upper jaw 17 is longer than the jaw 18 so that the median part 9e of each end portion 9a, 9b of the laminae engaged between the jaws 17 and 18, is in abutment with the said jaws at 17a and 18a of which the projected lines 17b and 18b on the median plane 19 of the laminae 9c and 9d are spaced from one another.

The members 16 are provided with fastening means for the ends 7b of the torsion bars 7. For this purpose each jaw assembly 16 has a splined opening 20 which cooperates with complementary splines disposed on the ends 7b of the bars 7. The end portions 9a, 9b of the flat laminae 9c and 9d are extended into shoulders 9f which are arranged opposite the sides 21 of the jaw assembly 16.

Moreover, the end faces 9g of the shoulders 9f define the total length L of the flat laminas 9c and 9d. One at least of the end faces 9g contiguous with each end 9a or 9b is arranged opposite the end 7b of the corresponding torsion bar 7. Moreover, the length L is substantially equal to the distance M which separates the ends 7b of the two torsion bars 7. The end face 9h of the median part 9e clears freely the base 22 of the opening of the jaw assembly 16 and the jaw 18.

The flat laminae 9c, 9d can be secured to the structure of the vehicle either resiliently or otherwise. In this case, as is illustrated in the drawings, a securing member is rigid with each of the jaw assemblies 16. This securing member is constituted by a projection 23 provided with a face 24 abutting on the structure 25 of the vehicle or of an interposed resilient mounting. A bolt 26 secures the jaw assembly 16 to the structure 25, while the lugs 15 rigid with the structure 25 are engaged in complementary recesses of the jaw assembly 16 and prevent any relative rotation of these two parts.

The two flat laminae 9c and 9d and the jaw assemblies 16 being made in separate parts has enabled the resilient assembly to be formed from a plurality of laminae. Now, it is known that it is advantageous to select several thin, light, superposed laminae, in the place of a single lamina; there is thus gained increased flexibility as well as reduced weight and increased mechanical resistance of the assembly. But, in the present embodiment, there is also a gain in cost, since the difficult and costly construction with direct cantiliver mounting of the torsion bars on a single resilient member is avoided. Moreover, the laminae may be selected from semi-finished industrial products without the necessity for a complementary operation. It is sufficient that the said laminae have the calculated flexibility, without the need to take into account the tolerances in shape, which are difficult to reproduce. In effect these tolerances have been transferred to the assemblies 16 which, being of small dimensions are machinable easily and with precision.

It should be noted, however, that the advantages of the construction given in detail have not been provided at the expense of the operational characteristics. In fact, it has been shown that although the assembly of the flat laminae 9c, 9d between the jaws 17, 18 of each jaw assembly 16 is very simple, these flat laminae are firmly held in place. They lie initially in a direction parallel to the torsion bars 7 by the shoulders 9f which are in abutment with the sides 21 of the jaw assemblies 16. They are also by selection of their total length L, which is slightly less than the length M, conducive to the maintenance of the flat laminae 9c, 9d in a median position without interference in their clearance.

Further, the projected lines 17b and 18b being separate, there is a lever arm at the end of which the abutment forces are developed. A couple is generated and is of such nature as to cause the flat bars 9c and 9d to operate correctly when bending. Moreover, this couple gives rise to the beginning of a jamming action of the flat laminas, which jamming is effective to hold the laminae at rest. The curved shape given to the jaws 17 and 18 facilitates the pivoting action of the laminae.

The torsion bars 7 are arranged either along the longitudinal members of the structure 25 and externally thereof, or internally of the longitudinal members.

What is claimed is:

1. In a suspension assembly for two wheels disposed respectively on opposite sides of the longitudinal plane of a vehicle, comprising at least one torsion bar associated with each of said wheels, a pivotal linkage assembly connecting one of the end portions of each bar with the respective wheel, and a resilient member interconnecting the other end portions of said torsion bars, the improvement comprising:
- at least one resilient laminar member forming said resilient member, and rigid jaw assemblies respectively coupling said torsion bars to said laminar member, said jaw assemblies having one jaw longer than the other, said laminar member being positioned in a plane parallel to the plane defined by said torsion bars.

2. An assembly according to claim 1, wherein the plane of the resilient laminar member lies in the plane of the torsion bars.

3. An assembly according to claim 1, comprising
- resilient securing means which serve to secure the rigid jaw assembly to the structure of the vehicle.

4. An assembly according to claim 3 wherein said resilient securing means is mounted on the vehicle structure substantially facing that end of the torsion bar which is secured to the resilient laminar member.

* * * * *